(12) United States Patent
Mobin et al.

(10) Patent No.: US 8,320,439 B2
(45) Date of Patent: Nov. 27, 2012

(54) METHODS AND APPARATUS FOR ADAPTIVE LINK PARTNER TRANSMITTER EQUALIZATION

(75) Inventors: Mohammad S. Mobin, Orefield, PA (US); Gregory W. Sheets, Breinigsville, PA (US); Lane A. Smith, Easton, PA (US); Paul H. Tracy, Lehigh, PA (US)

(73) Assignee: Agere Systems Inc., Allentown, PA (US)

( * ) Notice: Subject to any disclaimer, the term of this patent is extended or adjusted under 35 U.S.C. 154(b) by 1177 days.

(21) Appl. No.: 12/040,575

(22) Filed: Feb. 29, 2008

(65) Prior Publication Data

US 2009/0219978 A1    Sep. 3, 2009

(51) Int. Cl.
*H03H 7/30* (2006.01)

(52) U.S. Cl. ........ 375/232; 375/230; 375/229; 375/219; 375/295; 375/316; 333/18; 381/103; 708/323

(58) Field of Classification Search ................... 375/232, 375/230, 229, 219, 295, 316; 333/18, 28; 381/103; 708/323
See application file for complete search history.

(56) References Cited

U.S. PATENT DOCUMENTS

| | | | |
|---|---|---|---|
| 2002/0060820 A1 | 5/2002 | Buchali | |
| 2004/0001539 A1* | 1/2004 | Sankaran et al. | 375/231 |
| 2004/0001540 A1* | 1/2004 | Jones | 375/231 |
| 2005/0078758 A1* | 4/2005 | Aziz et al. | 375/257 |
| 2005/0281343 A1 | 12/2005 | Hsu et al. | |
| 2006/0007997 A1* | 1/2006 | Jones | 375/231 |
| 2006/0067387 A1* | 3/2006 | Ahmed et al. | 375/219 |
| 2007/0253477 A1 | 11/2007 | Abel et al. | |
| 2007/0268962 A1 | 11/2007 | Mobin et al. | |
| 2008/0151986 A1* | 6/2008 | Patton | 375/231 |

FOREIGN PATENT DOCUMENTS

| | | |
|---|---|---|
| EP | 0 492 856 | 7/1992 |
| EP | 1 643 678 | 4/2006 |

* cited by examiner

*Primary Examiner* — Zewdu Kassa

(74) *Attorney, Agent, or Firm* — Ryan, Mason & Lewis, LLP

(57) ABSTRACT

Methods and apparatus are provided for adaptive link partner transmitter equalization. According to one aspect of the invention, a local transceiver adapts one or more equalization parameters of a link partner by receiving a training frame over a channel between the link partner and the local transceiver, wherein the training frame is comprised of a predefined training pattern; adjusting one or more of the equalization parameters of the link partner; and determining whether the equalization of the channel satisfies one or more predefined criteria based on whether the predefined training pattern is properly received by the local transceiver. The predefined training pattern can be a pseudo random pattern, such as a PN11 pattern Noise margins and jitters margins for the channel can optionally be improved.

20 Claims, 7 Drawing Sheets

METHODS AND APPARATUS FOR ADAPTIVE LINK PARTNER TRANSMITTER EQUALIZATION

FIELD OF THE INVENTION

The present invention is related to equalization techniques and, more particularly, to techniques for equalizing a link partner transmitter.

BACKGROUND OF THE INVENTION

10 Gigabit Ethernet (10GbE) is a set of Ethernet standards with a nominal data rate of 10 Gbit/s. 10GbE over fiber, copper cabling and twisted pair are specified by the IEEE 802.3 standard IEEE 802.3 is a collection of standards defining the physical layer, and the media access control (MAC) sublayer of the data link layer for wired Ethernet. IEEE 802.3ap, for example, provides a standard for Backplane Ethernet over printed circuit boards, with rates of 1 and 10 Gbit/s The IEEE 802.3ap standard defines the physical medium dependent sublayer (PMD) control function. The PMD control function implements the 10GBASE-KR start-up protocol, which provides a mechanism through which the local receiver can tune the link-partner transmit equalizer to optimize performance over the backplane interconnect, and to inform the link partner when training is complete and it is ready to receive data. This mechanism is implemented through the continuous exchange of fixed-length training frames. These training frames are used by the two physical layer devices to exchange control and status information necessary to configure the adaptive equalization filters for both devices. The training frames include a header, a coefficient update field, a status report field, and a PN11 training pattern field The IEEE 802.3ap standard does not define the usage of the PN11 training pattern field by the receiver. In order to equalize a backplane, the receiver designer typically allocates the equalization burden between both the receiver and the transmitter. The equalization is evaluated based on one or more predefined criteria. Generally, the transmitter equalization time is limited and the equalization space is vast. Thus, conventional equalization criterions are sub-optimal and ate not suitable for IEEE 802.3ap applications. A need therefore exists for improvements in the equalization speed

SUMMARY OF THE INVENTION

Generally, methods and apparatus are provided for adaptive link partner transmitter equalization. According to one aspect of the invention, a local transceiver adapts one or more equalization parameters of a link partner by receiving a training frame over a channel between the link partner and the local transceiver, wherein the training frame is comprised of a predefined training pattern; adjusting one or more of the equalization parameters of the link partner; and determining whether the equalization of the channel satisfies one or more predefined criteria based on whether the predefined training pattern is property received by the local transceiver.

The predefined training pattern can be a pseudo random pattern, such as a PN11 pattern. The step of determining the equalization of the channel satisfies one or more predefined criteria can be performed by a pseudo random pattern checker; such as a PN11 checker.

According to another aspect of the invention, a noise margin for the channel is optionally improved. The noise margin for the channel can be improved by varying a voltage threshold of one or more latches while varying the one or more of the equalization parameters. The noise margin can be established, for example, based on whether the predefined training pattern is properly received by the local transceiver.

According to another aspect of the invention, a jitter margin for the channel is optionally improved. The jitter margin for the channel can be improved by varying a time offset of one or more latches while varying the one or more of the equalization parameters. The jitter margin can be established, for example, based on whether the predefined training pattern is properly received by the local transceiver.

A more complete understanding of the present invention, as well as further features and advantages of the present invention, will be obtained by reference to the following detailed description and drawings.

DETAILED DESCRIPTION

The present invention provides methods and apparatus for adaptive link partner transmitter equalization According to one aspect of the invention, discussed further below, the equalization is performed by observing the lock status of the PN11 checker (or another pseudo random pattern checker) while the PMD link layer communicates The accuracy of the received PN11 training pattern (or another pseudo random pattern) is used as an indication of whether the channel is properly equalized. In this manner, the link partner transmitter FIR coefficients are adapted during the training process. According to a further aspect of the invention, one or more decision latches are placed in one or more of a predefined target noise margin and/or jitter margin level, rather than at an optimal eye sampling position, to improve the noise and/or jitter margin.

Figure 1:
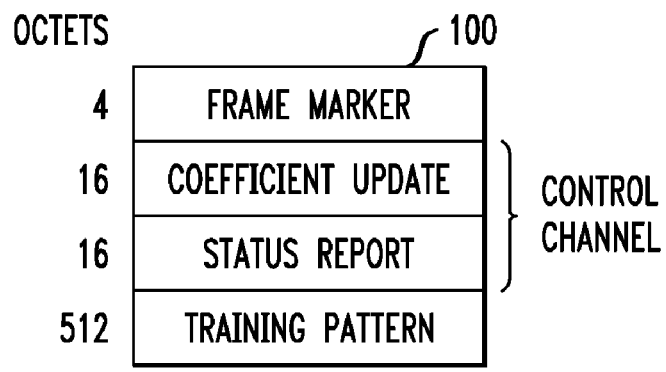
FIG. 1 illustrates an exemplary training frame structure in accordance with the IEEE 802.3ap standard.

FIG. 1 illustrates an exemplary training frame structure 100 in accordance with the IEEE 802.3ap standard. As shown in FIG. 1, the exemplary training frame structure 100 comprises a four octet frame marker, a 16 octet (1 octet=8 bits) coefficient update (e.g., instructions for FIR coefficient settings of link partner transmitter), a 16 octet status report and a 512 octet PN11 training pattern. The four octet frame marker delimits each frame using a 32-bit pattern, hexadecimal FFFF0000. This pattern is said to provide a unique indication of the start of a training frame The next two fields for the coefficient update and status report (256 bits) are transmitted using Differential Manchester Encoding (DME), as discussed further below in conjunction with FIG. 2. Finally, the 512 octet PN11 training pattern is transmitted.

A 100BASE-KR device is often required to transmit and receive training frames 100 during the startup protocol. The training frames are transmitted (and received) repeatedly until both devices reach an agreement on the control information necessary to configure their adaptive equalization filters. Each frame includes 4384 bits of data. These bits are typically transmitted at the 10G speed (1 bit per Unit Interval).

Figure 2:
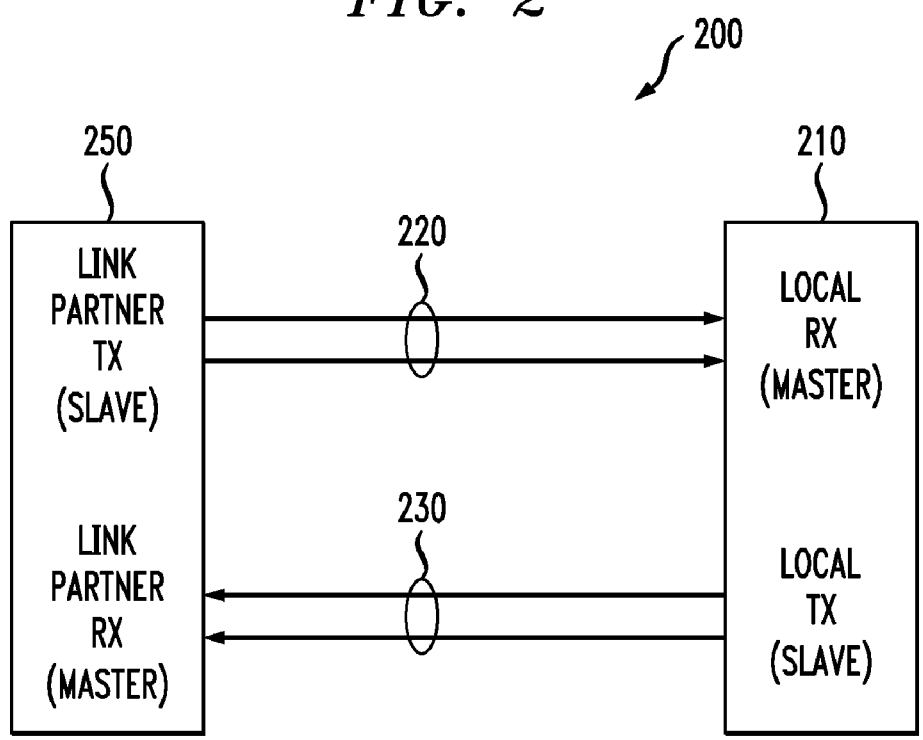
FIG. 2 is block diagram of a PMD link block in accordance with a handshake operation of the IEEE 802.3ap standard.

FIG. 2 is block diagram of a PMD link block 200 in accordance with a handshake operation of the IEEE 802.3ap standard As shown in FIG. 2, the PMD link block 200 comprises a local transceiver 210 and a link partner transceiver 250. The local transceiver 210 and link partner transceiver 250 ate connected by a backplane and communicate with each other over a back channel. As shown in FIG. 2, a link partner communication channel 220 includes coefficient update instructions for the local transmitter of transceiver 210 and a status report of the transmitter of link partner transceiver 250 (sometimes referred to herein as LP transmitter) for the receiver of transceiver 210 (sometimes referred to herein as local receiver). In addition, a local PMD control channel 230 includes coefficient update instructions for the transmitter of transceiver 250 (sometimes referred to herein as LP transmitter) and a status report of the transmitter of transceiver 210 for the receiver of transceiver 250 (sometimes referred to herein as LP receiver).

In the arrangement of FIG. 2, the receiver of transceiver 210 trains the transmitter of link partner transceiver 250 using a PMD control function. The IEEE 802.3ap specification defines a PMD control function to send instructions to update the transmitter of link partner transceiver 250 and a status function to know the status of the state of the transmitter of link partner transceiver 250.

Figure 3:
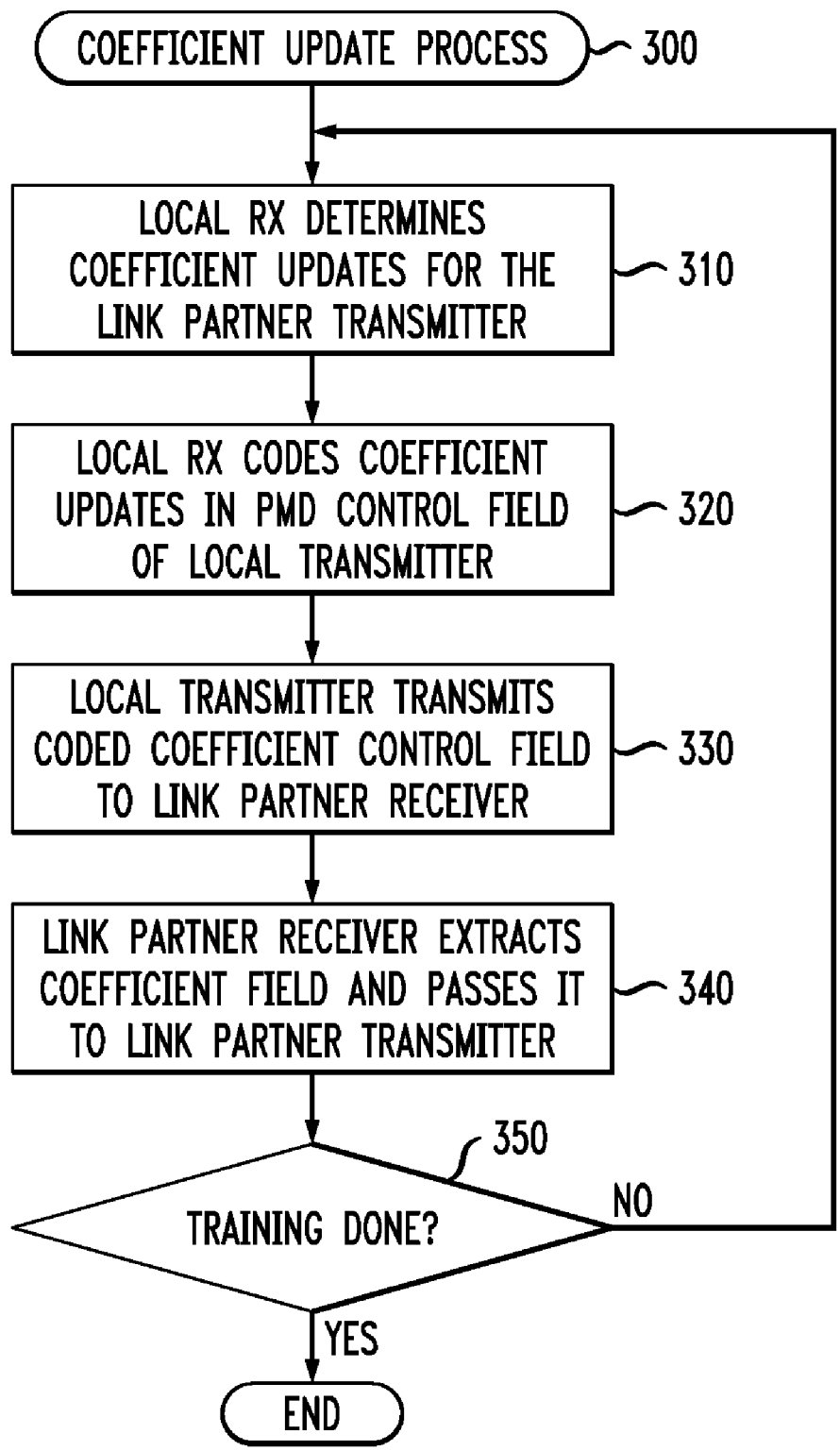
FIG. 3 is a flow chart describing an exemplary implementation of a coefficient update process in accordance with the IEEE 802.3ap standard.

FIG. 3 is a flow chart describing an exemplary implementation of a coefficient update process 300 in accordance with the IEEE 802.3ap standard. Generally, during the coefficient update process 300 the local receiver notifies the link partner transmitter to update its FIR coefficients. During step 310, the local receiver determines coefficient updates for the link partner transmitter. The local receiver then codes the coefficient updates in the PMD control field of the local transmitter during step 320. The local transmitter then transmits the coded coefficient control field to the link partner receiver during step 330. Finally, the link partner receiver extracts the coefficient field and passes it to the link partner transmitter during step 340.

A test is performed during step 350 to determine if the training is complete. If it is determined during step 350 that the training is not complete then, program control returns to step 310 and continues in the manner described above. If, however, it is determined during step 350 that the training is complete, then program control terminates.

Figure 4:
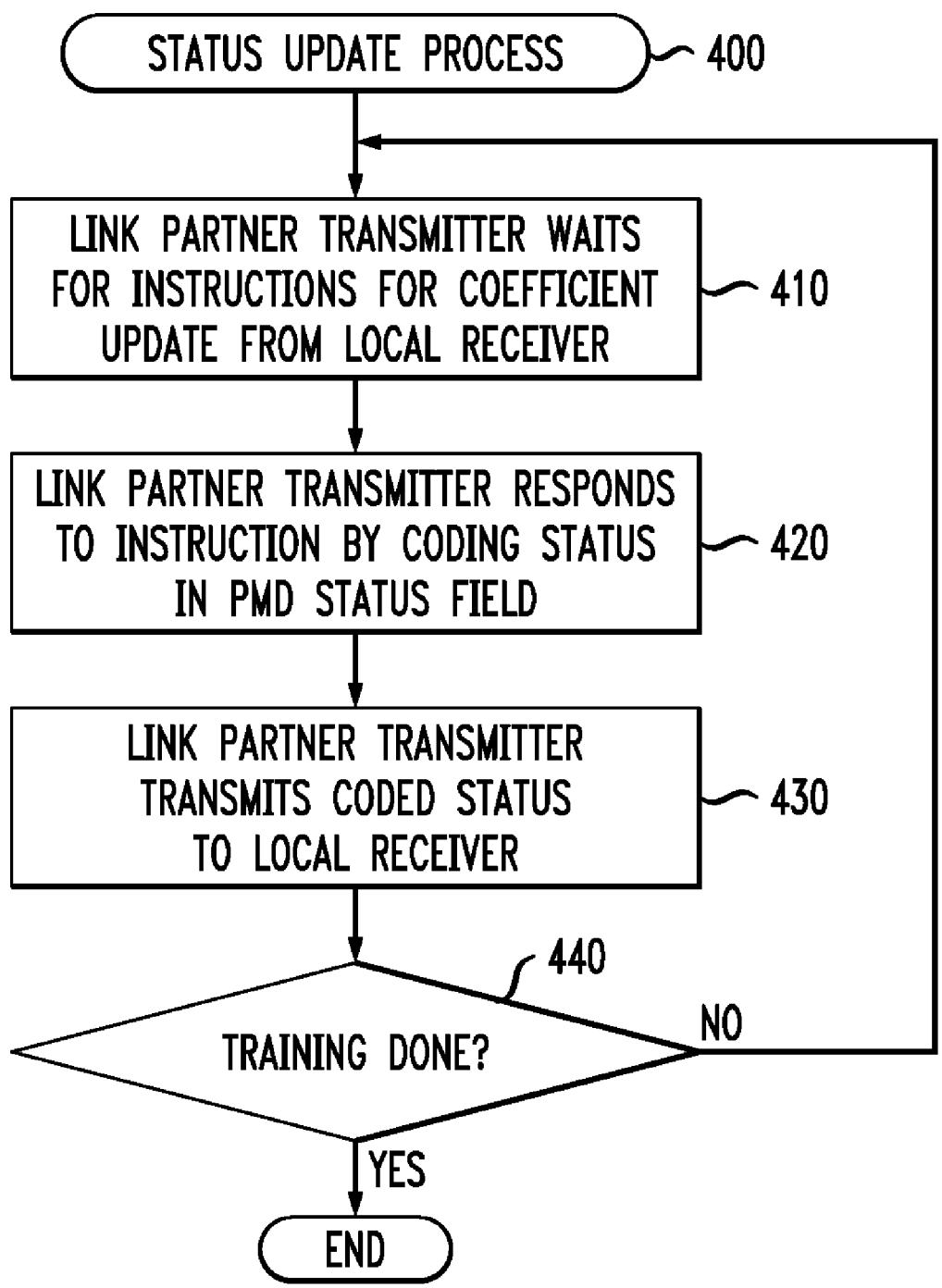
FIG. 4 is a flow chart describing an exemplary implementation of a status update process in accordance with the IEEE 802.3ap standard.

FIG. 4 is a flow chart describing an exemplary implementation of a status update process 400 in accordance with the IEEE 802.3ap standard. Generally, the status update process 400 comprises the link partner transmitter notifying the local receiver of the status of its FIR coefficient update process. As shown in FIG. 4, during the status update process 400, the link partner transmitter waits for instructions for coefficient update from the local receiver during step 410. Thereafter, the link partner transmitter responds to the received instructions by coding its status in the PMD status field during step 420. Finally, the link partner transmitter transmits the coded status to the local receiver during step 430.

As previously indicated, the accuracy of the received PN11 training pattern indicates whether the channel is properly equalized. As discussed hereinafter, the transmitter and receiver perform joint adaptation of the transceiver system. In one implementation, the joint equalization adaptation process consists of a coefficient preset or a coefficient initialization process, followed by a coefficient adaptation process, in accordance with the IEEE 802.3ap standard. Generally, in a coefficient preset phase, the transmitter FIR coefficients are preset to the main tap only. In a coefficient initialization process, the transmitter FIR coefficients are set to preset values specified by the 802.3ap standard.

A test is performed during step 440 to determine if the training is complete. If it is determined during step 440 that the training is not complete then, program control returns to step 410 and continues in the manner described above. If, however, it is determined during step 440 that the training is complete, then program control terminates.

Figure 5:
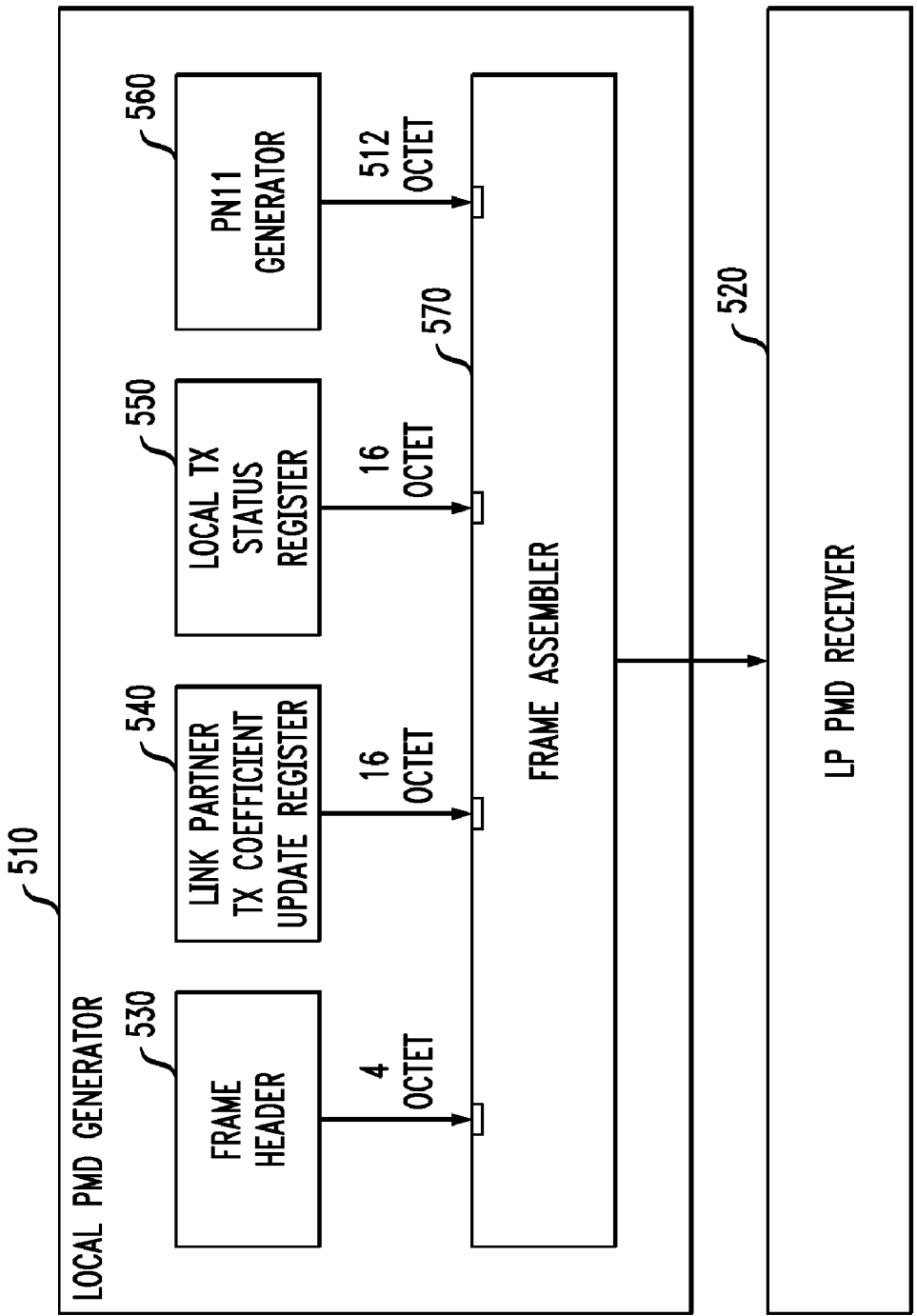
FIG. 5 is a block diagram of an exemplary PMD training frame generator in the local PMD transmitter, in accordance with the IEEE 802.3ap standard.

FIG. 5 is a block diagram of an exemplary PMD training frame generator 510 in the local PMD transmitter, in accordance with the IEEE 802.3ap standard. As shown in FIG. 5, the PMD training frame generator 510 comprises a frame header register 530, a link partner IX coefficient update register 540, a local TX status register 550, and a PN11 generator 560. Collectively, the elements 530, 540, 550, 560 provide the required components of the training frame 100 of FIG. 1. The training frame components awe provided to a frame assembler 570 that forms the frame 100 for transmission to the LP PMD receiver 520. It is noted that the PMD training frame generator 510 is part of the local PMD generator.

Figure 6:
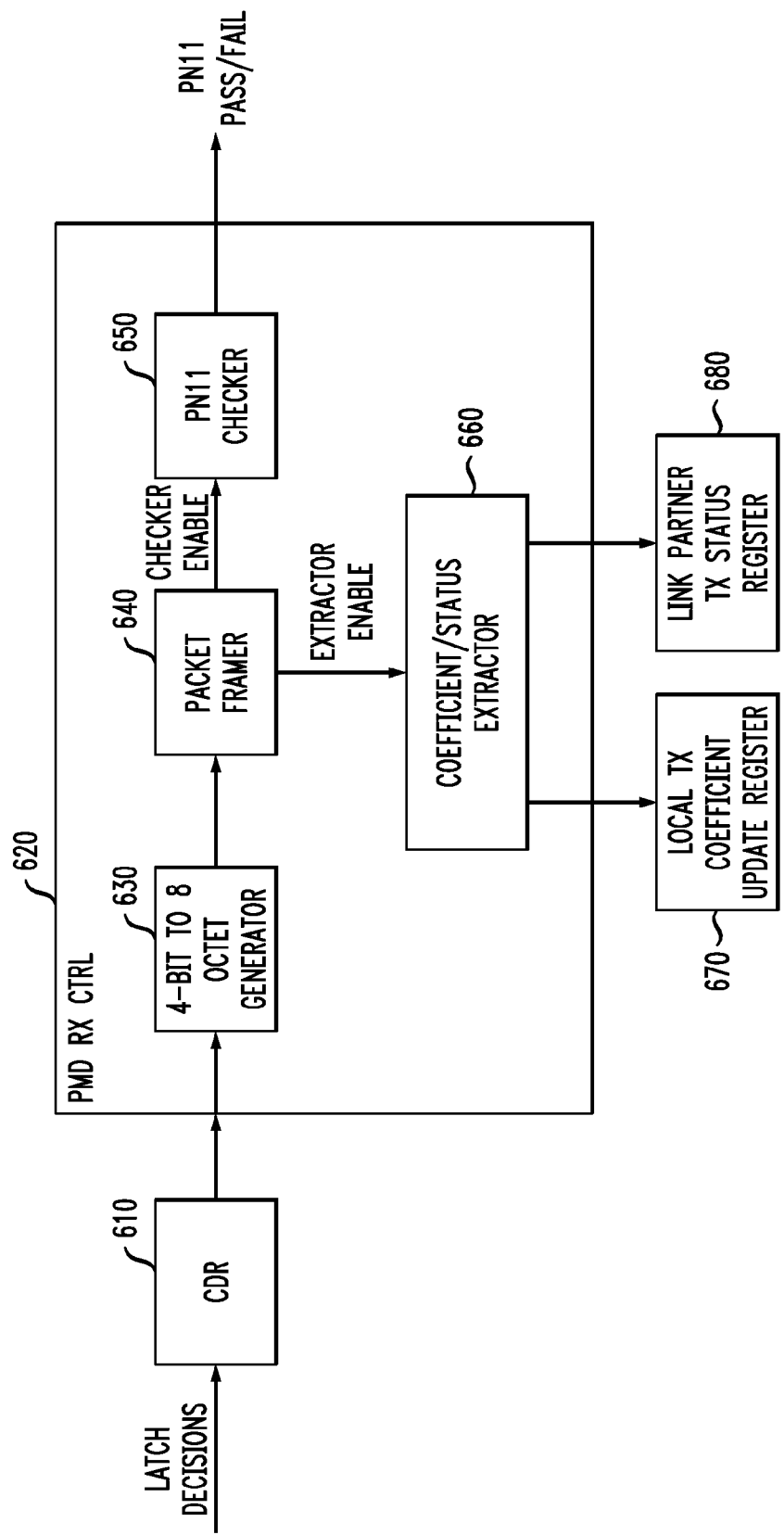
FIG. 6 is a block diagram of an exemplary PMD training frame extractor in the local PMD receiver that incorporates features of the present invention.

FIG. 6 is a block diagram of an exemplary PMD training frame extractor 620 for the local PMD receiver that incorporates features of the present invention. As shown in FIG. 6, the PMD training frame extractor 620 receives the recovered signal from a clock and data recovery system 610. The exemplary PMD training frame extractor 620 comprises an n-bit to m-bit generator 630, such as a 4-bit to 8 octet generator, a packet framer 640, a PN11 checker 650, a coefficient/status extractor 660, a local TX coefficient update register 670 and a link partner TX status register 680.

The packet framer 640 may be embodied, for example, using the techniques described in U.S. patent application Ser. No. 11/967,463, filed Dec. 31, 2007, entitled, "Methods and Apparatus for Detecting and Decoding Adaptive Equalization Training Frames," incorporated by reference herein. In addition to the functions specified by the IEEE 802.3ap standard, the PN11 checker 650 evaluates the accuracy of the received PN11 training pattern to determine if the channel is properly equalized, in accordance with the present invention. The PN11 checker 650 determines it the received PN11 pattern is properly received (pass/fail) during the equalization coefficient adaptation process, based on decisions from latches that are discussed below in conjunction with FIG. 7. The coefficient/status extractor 660 extracts the equalization coefficients and LP status from the received frames, which are stored in the local TX coefficient update register 670 and a link partner TX status register 680, respectively, in a known manner.

Figure 7:
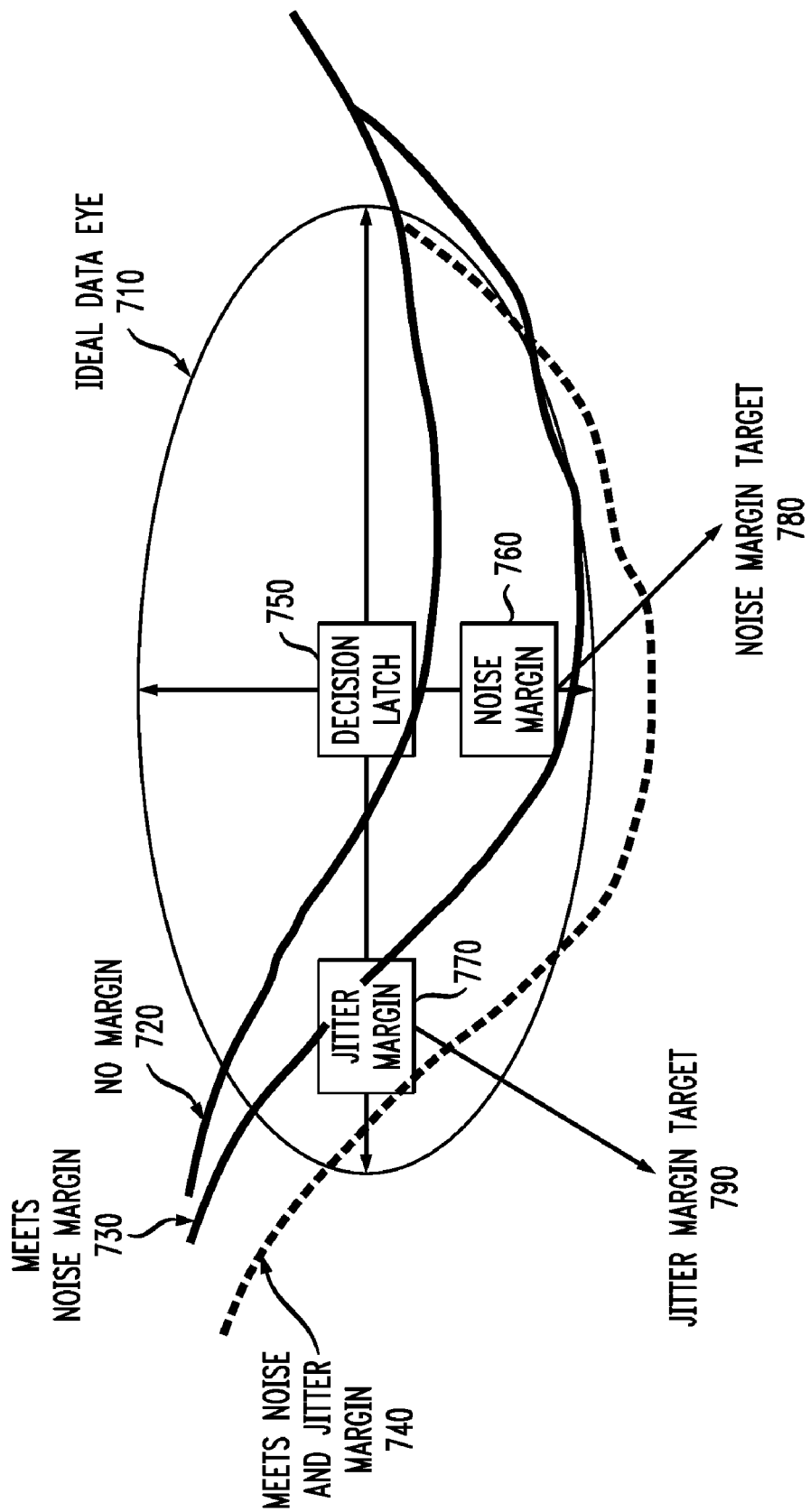
FIG. 7 illustrates the noise margin and jitter margin relative to a data eye.

As indicated above, a further aspect of the invention positions one or more decision latches in one or more of a predefined target noise margin and/or jitter margin level, rather than at the optimal eye sampling position, to improve the noise and/or jitter margin. FIG. 7 illustrates the noise margin and jitter margin relative to a data eye 710. In this manner, the receiver is able to define the target jitter and noise margin As shown in FIG. 7, a noise margin latch 760 is placed at a target amplitude margin level at a certain voltage level based on a noise margin target 780, substantially aligned with the data sampling clock. In addition, a decision latch 750 is also aligned with the data sampling clock, in a known manner. In addition, a target jitter margin latch 770 is place at a time offset away from the decision latch 750 at a certain time base. The time offset is based on a jitter margin target 790. It is noted that three distinct latches 750, 760, 770 can be employed, as shown in FIG. 7, or a time/voltage multiplexing technique can be employed by varying the latch thresholds and/or time offsets over time to reduce the number of required latches.

As discussed further below in conjunction with FIG. 7, to measure the achievement of the noise margin, the output of the noise margin latch 760 is applied to the PN11 checker 650 while the transmit FIR coefficients are adjusting. For each transmit FIR coefficient setting, the PN11 checker 650 determines if the PN11 pattern is properly received (indicating sufficient equalization). Initially, the output of the PN11 checker 650 will fail until the desired noise margin is achieved declaring attainment of the desired transmit adaptation level.

In a similar manner, the output of the jitter margin latch 770 is applied to the PN11 checker 650 while the transmit FIR coefficients are adjusting For each transmit FIR coefficient setting, the PN11 checker 650 determines if the PN11 pattern is properly received (indicating sufficient equalization).

FIG. 7 also illustrates the improvement in the data eye at the receiver as the equalization adaptation is performed in accordance with the present invention. As shown in FIG. 7, a first curve 720 indicates the initial eye for un-equalized transmitter settings, a second curve 730 corresponds to the transmit FIR settings that achieve the desired noise margin 780, and a third curve 740 corresponds to the transmit FIR settings that achieve both the noise margin 780 and the jitter margin 790. It is noted that curve 730 could correspond to the jitter margin and curve 740 could correspond to the noise margin.

Figure 8:
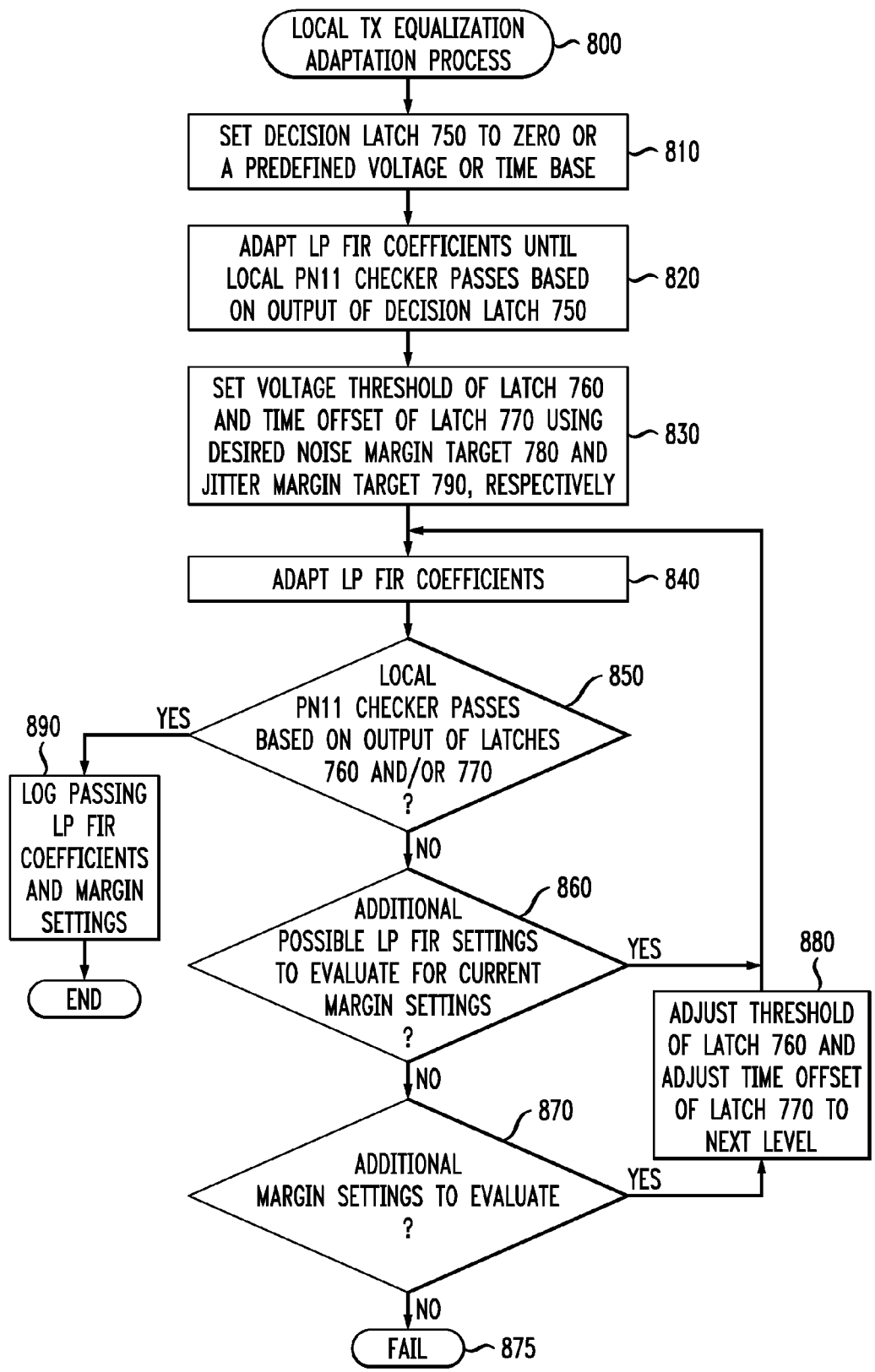
FIG. 8 is a flow chart of an exemplary local transmitter equalization adaptation process incorporating features of the present invention.

FIG. 8 is a flow chart of an exemplary TX equalization adaptation process 800 incorporating features of the present invention. The exemplary TX equalization adaptation process 800 is implemented, for example, by a microprocessor of the local transceiver to adapt the equalization coefficients of the link partner. As shown in FIG. 8, the local TX equalization adaptation process 800 initially sets the voltage threshold of the decision latch 750 to zero or a predefined voltage or time base during step 810. Thereafter, the LP FIR coefficients are adapted during step 820 until the local PN11 checker 650 passes based on an output of the decision latch 750. Once step 820 passes, the TX equalization adaptation process 800 then proceeds to improve the noise and timing margins.

During step 830, the local TX equalization adaptation process 800 sets the voltage threshold of the noise margin latch 760 and the timing offset of the jitter margin latch 770, based on the desired noise margin target 780 and jitter margin target 790, respectively. The LP FIR coefficients are adapted during step 840. A test is performed during step 850 to determine it the local PN11 checker passes based on the output of the margin latches 760 and/or 770. If it is determined during step 850 that the local PN11 checker passed based on the output of the margin latches 760, 770, then the passing LP FIR coefficients and margin settings ate logged during step 890. These LP FIR coefficients and margin settings provide sufficient equalization with the best possible margin that satisfies the margin targets 780, 790.

If however, it is determined during step 850 that the local PN11 checker failed based on the output of the margin latches 760, 770, then a further test is performed during step 860 to determine if there are additional possible LP FIR settings to evaluate for the current margin settings. If it is determined during step 860 that there ate additional possible LP FIR settings to evaluate for the current margin settings, then program control returns to step 840 to further adapt the LP FIR settings for the current margin settings.

If however, it is determined during step 860 that there are no additional possible LP FIR settings to evaluate for the current margin settings, then a further test is performed during step 870 to determine if there are additional margin settings to evaluate. If it is determined during step 870 that there are additional possible margin settings to evaluate, then the threshold of latch 760 and the time offset of latch 770 are adjusted to the next level during step 880. Program control returns to step 840 to further adapt the LP FIR settings for the adjusted margin settings.

If, however, it is determined during step 870 that there are no additional margin settings to evaluate, then the local IX equalization adaptation process 800 fails during step 875 without identifying acceptable LP FIR coefficients and margin settings.

While FIGS. 3, 4 and 8 show an exemplary sequence of steps, it is also an embodiment of the present invention that the sequence may be varied. Various permutations of the algorithms are contemplated as alternate embodiments of the invention. In addition, while exemplary embodiments of the present invention have been described with respect to processing steps in a software program, as would be apparent to one skilled in the art, various functions may be implemented in the digital domain as digital logic blocks, in hardware by circuit elements or state machines, or in combination of both software and hardware. Such software may be employed in, for example, a digital signal processor, micro-controller, or general-purpose computers. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can stole information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method performed by a local transceiver for adapting one or more equalization parameters of a remote link partner, comprising
   receiving a training frame over a channel between said link partner and said local transceiver, wherein said training frame is comprised of a predefined training pattern;
   adjusting one or more of said equalization parameters of said remote link partner while varying one or more of a time offset and a voltage threshold of one or more latches; and
   determining whether said equalization of said channel satisfies one or more predefined margin criteria based on whether a comparison of said one or more latches to at least one decision latch indicates that a corresponding target value is satisfied.

2. The method of claim 1, wherein said predefined training pattern is a pseudo random pattern.

3. The method of claim 2, wherein said determining step further comprises determining if said predefined training pattern is properly received by said local transceiver using a pseudo random pattern checker.

4. The method of claim 1, further comprising the step of improving a noise margin for said channel.

5. The method of claim 4, wherein said step of improving a noise margin for said channel further comprises the step of varying said voltage threshold of said one or more latches while varying said one or more of said equalization parameters.

6. The method of claim 5, wherein said noise margin is established based on whether said predefined training pattern is properly received by said local transceiver.

7. The method of claim 1, further comprising the step of improving a jitter margin for said channel.

8. The method of claim 7, wherein said step of improving a jitter margin for said channel further comprises the step of varying said time offset of said one or more latches while varying said one or more of said equalization parameters.

9. The method of claim 8, wherein said jitter margin is established based on whether said predefined training pattern is properly received by said local transceiver.

10. A local transceiver, comprising:
    a memory; and
    at least one processor, coupled to the memory, operative to adapt one or more equalization parameters of a remote link partner by performing the following steps:
    receive a training frame over a channel between said remote link partner and said local transceiver, wherein said training frame is comprised of a predefined training pattern;
    adjust one or more of said equalization parameters of said remote link partner while varying one or more of a time offset and a voltage threshold of one or more latches; and
    determine whether said equalization of said channel satisfies one or more predefined margin criteria based on whether a comparison of said one or more latches to at least one decision latch indicates that a corresponding target value is satisfied.

11. The local transceiver of claim 10, wherein said predefined training pattern is a pseudo random pattern.

12. The local transceiver of claim 11, further comprising a pseudo random pattern checker to determine if said predefined training pattern is properly received by said local transceiver.

13. The local transceiver of claim 10, wherein said processor is further configured to improve a noise margin for said channel.

14. The local transceiver of claim 13, wherein said noise margin for said channel is improved by varying said voltage threshold of said one or more latches while varying said one or more of said equalization parameters.

15. The local transceiver of claim 14, wherein said noise margin is established based on whether said predefined training pattern is properly received by said local transceiver.

16. The local transceiver of claim 10, wherein said processor is further configured to improve a jitter margin for said channel.

17. The local transceiver of claim 16, wherein said jitter margin for said channel is improved by varying said time offset of said one or more latches while varying said one or more of said equalization parameters.

18. The local transceiver of claim 17, wherein said jitter margin is established based on whether said predefined training pattern is properly received by said local transceiver.

19. A training frame extractor for a receiver, comprising:
    a memory; and
    at least one processor, coupled to the memory, operative to adapt one or more equalization parameters of a remote link partner by performing the following steps:
    receive a training frame over a channel between said remote link partner and said local transceiver, wherein said training frame is comprised of a predefined training pattern;
    adjust one or more of said equalization parameters of said remote link partner while varying one or more of a time offset and a voltage threshold of one or more latches; and
    determine whether said equalization of said channel satisfies one or more predefined margin criteria based on whether a comparison of said one or more latches to at least one decision latch indicates that a corresponding target value is satisfied.

20. The training frame extractor of claim 19, wherein said predefined training pattern is a pseudo random pattern.

* * * * *